US008909750B2

(12) United States Patent
Lu et al.

(10) Patent No.: US 8,909,750 B2
(45) Date of Patent: Dec. 9, 2014

(54) METHOD FOR DISCONNECTING MULTIPLE HOSTS FROM NETWORK WHEN THE GATEWAY MOBILE STATION USED BY THE MULTIPLE HOSTS INDICATES IT IS EXITING THE NETWORK, AND NETWORK MANAGEMENT DEVICE

(75) Inventors: Lei Lu, Shenzhen (CN); Liang Gu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 646 days.

(21) Appl. No.: 12/910,503

(22) Filed: Oct. 22, 2010

(65) Prior Publication Data

US 2011/0035482 A1  Feb. 10, 2011

Related U.S. Application Data

(63) Continuation of application No. PCT/CN2009/071389, filed on Apr. 21, 2009.

(30) Foreign Application Priority Data

May 7, 2008  (CN) .......................... 2008 1 0096926

(51) Int. Cl.

| G06F 15/16 | (2006.01) |
|---|---|
| G06F 15/173 | (2006.01) |
| H04L 12/28 | (2006.01) |
| H04L 12/56 | (2006.01) |
| H04L 12/66 | (2006.01) |
| H04W 76/06 | (2009.01) |
| H04W 88/18 | (2009.01) |
| H04L 12/64 | (2006.01) |
| H04L 29/06 | (2006.01) |

(52) U.S. Cl.

CPC ............ *H04L 12/66* (2013.01); *H04W 76/062* (2013.01); *H04L 63/0892* (2013.01); *H04L 29/06333* (2013.01); *H04W 88/182* (2013.01); *H04L 12/6418* (2013.01)

USPC ......... 709/223; 370/395.2; 370/401; 709/228

(58) Field of Classification Search

CPC ... H04L 12/66; H04L 12/648; H04L 63/0892; H04L 29/06333; H04W 76/0621; H04W 88/182

USPC ........................ 709/223, 228; 370/395.2, 401

See application file for complete search history.

(56) References Cited

U.S. PATENT DOCUMENTS 6,535,918 B1 *  3/2003  Bender et al. .................. 709/228
6,765,920 B1 *  7/2004  Tari et al. ....................... 370/401

(Continued)

FOREIGN PATENT DOCUMENTS

CN  101043731 A  9/2007
CN  101043732 A  9/2007

(Continued)

OTHER PUBLICATIONS

International Search Report, PCT/CN2009/071389, Date of Mailing Jul. 23, 2009, 4 pages.

(Continued)

*Primary Examiner* — Daniel C Murray
(74) *Attorney, Agent, or Firm* — Slater & Matsil, L.L.P.

(57) ABSTRACT

A method for a multi-host system to exit from the network includes receiving a G-MS exit network instruction. The context information relating to the host connected to the G-MS is obtained. A host exit network instruction is sent to the host network management entity according to the ID of the host network management entity. The host is triggered to exit from the network. The obtained host context information includes the ID of the host connected to the G-MS and the ID of the host network management entity. The exit network instruction carries the host ID.

19 Claims, 11 Drawing Sheets

(56) References Cited

U.S. PATENT DOCUMENTS

| | | | |
|---|---|---|---|
| 6,826,396 B1* | 11/2004 | Yasue et al. | 455/412.1 |
| 6,925,076 B1* | 8/2005 | Dalgic et al. | 370/356 |
| 6,965,767 B2 | 11/2005 | Maggenti et al. | |
| 7,085,571 B2 | 8/2006 | Kalhan et al. | |
| 7,088,992 B2* | 8/2006 | Yasue et al. | 455/412.1 |
| 7,123,917 B2* | 10/2006 | Kalhan et al. | 455/437 |
| 7,245,589 B2* | 7/2007 | Neulist et al. | 370/254 |
| 7,302,271 B2* | 11/2007 | Kalhan et al. | 455/456.1 |
| 7,395,336 B1* | 7/2008 | Santharam et al. | 709/227 |
| 7,480,520 B2* | 1/2009 | Yasue et al. | 455/560 |
| 7,616,962 B2* | 11/2009 | Oswal et al. | 455/452.2 |
| 7,961,681 B2* | 6/2011 | Wu et al. | 370/329 |
| 8,094,631 B2* | 1/2012 | Banerjea et al. | 370/338 |
| 8,103,276 B2 | 1/2012 | Ryu | |
| 8,112,084 B2* | 2/2012 | Wu et al. | 455/435.1 |
| 8,160,051 B2* | 4/2012 | Yasue et al. | 370/349 |
| 8,311,010 B1* | 11/2012 | Qian et al. | 370/331 |
| 8,411,678 B2* | 4/2013 | De Smedt et al. | 370/389 |
| 8,547,872 B2* | 10/2013 | Raleigh | 370/252 |
| 8,644,249 B2* | 2/2014 | Bucker et al. | 370/331 |
| 2001/0054101 A1* | 12/2001 | Wilson | 709/225 |
| 2003/0145119 A1* | 7/2003 | Bender et al. | 709/249 |
| 2004/0128345 A1* | 7/2004 | Robinson et al. | 709/203 |
| 2004/0192337 A1* | 9/2004 | Hines et al. | 455/456.1 |
| 2004/0203763 A1* | 10/2004 | Tammi | 455/435.1 |
| 2004/0208132 A1* | 10/2004 | Neulist et al. | 370/252 |
| 2004/0234060 A1* | 11/2004 | Tammi et al. | 379/204.01 |
| 2005/0054323 A1* | 3/2005 | Yasue et al. | 455/403 |
| 2005/0083903 A1* | 4/2005 | Yasue et al. | 370/349 |
| 2005/0281269 A1* | 12/2005 | Choi | 370/395.2 |
| 2006/0019708 A1* | 1/2006 | Raman et al. | 455/561 |
| 2006/0056396 A1* | 3/2006 | Chao et al. | 370/352 |
| 2006/0059963 A1 | 3/2006 | Conforti | |
| 2007/0204048 A1* | 8/2007 | Zhang | 709/227 |
| 2008/0080510 A1* | 4/2008 | Zancan | 370/392 |
| 2008/0227458 A1* | 9/2008 | Wu | 455/437 |
| 2008/0316962 A1* | 12/2008 | Wu et al. | 370/329 |
| 2009/0052396 A1* | 2/2009 | Bucker et al. | 370/331 |
| 2009/0124285 A1* | 5/2009 | Yasue et al. | 455/552.1 |
| 2009/0141683 A1* | 6/2009 | Grinshpun et al. | 370/331 |
| 2009/0222920 A1* | 9/2009 | Chow et al. | 726/23 |
| 2010/0268787 A1* | 10/2010 | Wu et al. | 709/207 |
| 2010/0278091 A1* | 11/2010 | Sung et al. | 370/312 |
| 2011/0035482 A1 | 2/2011 | Lu et al. | |
| 2011/0170554 A1* | 7/2011 | De Smedt et al. | 370/401 |
| 2011/0281581 A1* | 11/2011 | Brandt et al. | 455/427 |
| 2012/0106512 A1* | 5/2012 | Banerjea et al. | 370/331 |
| 2013/0170425 A1* | 7/2013 | Sung et al. | 370/312 |

FOREIGN PATENT DOCUMENTS

| | | |
|---|---|---|
| CN | 101043741 A | 9/2007 |
| CN | 101047710 A | 10/2007 |
| CN | 101072139 A | 11/2007 |
| CN | 101400154 A | 4/2009 |
| CN | 101577634 A | 11/2009 |
| KR | 2004-0082508 A | 9/2004 |

OTHER PUBLICATIONS

PCT Written Opinion of the International Searching Authority, received in Patent Cooperation Treaty Application No. PCT/CN2009/071389, mailed Jul. 23, 2009, 6 pages.

* cited by examiner

US 8,909,750 B2

METHOD FOR DISCONNECTING MULTIPLE HOSTS FROM NETWORK WHEN THE GATEWAY MOBILE STATION USED BY THE MULTIPLE HOSTS INDICATES IT IS EXITING THE NETWORK, AND NETWORK MANAGEMENT DEVICE

This application is a continuation of co-pending International Application No. PCT/CN2009/071389, filed Apr. 21, 2009, which designated the United States and was not published in English, and which claims priority to Chinese Application No. 200810096926.X, filed May 7, 2008, both of which applications are incorporated herein by reference.

TECHNICAL FIELD

The present invention relates to the field of communication technology and, in particular embodiments, to a method of disconnecting multiple host systems from a network, network management device and network system.

BACKGROUND

The Worldwide Interoperability for Microwave Access (WiMAX) can provide higher access speeds. The network infrastructure comprises Mobile Station (MS), Access Service Network (ASN), and Connectivity Service Network (CSN). As a mobile subscriber terminal, the MS is adapted for hosts to access a WiMAX network; the ASN is a set of network functions, adapted for WiMAX network terminal devices to provide wireless access service. The ASN further comprises base station (BS) and Access Service Network Gateway (ASN-GW). The CSN is adapted for a WiMAX network to provide Internet Protocol (IP) connection services.

FIG. 1 shows the current multi-host WiMAX network architecture, wherein the Gateway Mobile Station (G-MS) provides wireless interface capabilities, which can be shared with multiple hosts to deliver wireless interface access. Without the capability of wireless air interface access, hosts are connected to the WiMAX network through the G-MS. As hosts connect WiMAX network subscribers through the G-MS, the WiMAX network needs to manage hosts under the G-MS. The multi-host WiMAX network architecture can provide independent network connection services for hosts located at the back end of the G-MS. These services include independent network discovery and selection, authentication, and Quality of Service (QoS).

SUMMARY OF THE INVENTION

The inventor has discovered the following problems while researching and practicing the prior art. The current multi-host WiMAX network neither defines how the G-MS should exit from the network nor describes any operations on the hosts under the G-MS, causing the hosts to fail to exit from the network properly.

The present invention provides a method of disconnecting multiple host systems from a network, network management device and network system to ensure all hosts can exit from the network normally.

For this purpose, the present invention provides the following embodiments.

A method of disconnecting multiple hosts from the network includes receiving a Gateway Mobile Station (G-MS) exit network instruction and obtaining context information relating to a host connected to the G-MS. The host context information includes an identifier (ID) of the host connected to the G-MS and an ID of a host network management entity. A host exit network sends instruction to the host network management entity according to the ID of the network management entity, where the host exit network instruction carries the host ID.

A method of disconnecting multiple hosts from the network includes receiving a host exit network instruction, where the instruction carries an identifier (ID) of the host. The method also includes obtaining context information relating to a Gateway Mobile Station (G-MS) connected to the host according to the host ID. The G-MS context information includes an ID of a G-MS network management entity. A host exit network request is sent to the G-MS network management entity according to the ID of the G-MS network management entity. The host exit network request includes the host ID.

A G-MS network management device includes a G-MS exit network instruction receiving unit that is configured to receive a G-MS exit network instruction. A host context obtaining unit is configured to obtain context information relating to a host connected to a G-MS after receiving the G-MS exit network instruction by the G-MS exit network instruction receiving unit. The obtained host context information includes an identifier (ID) of the host connected to the G-MS and an ID of a host network management entity. A host exit network instruction sending unit is configured to send a host exit network instruction to the host network management entity according to the ID of the host network management entity. The host exit network instruction carries the host ID.

A host network management device includes a receiving unit that is configured to receive a host exit network instruction, where the instruction carries a host identifier (ID). A G-MS context information obtaining unit is configured to obtain G-MS context information connected to the host according to the host ID after receiving a host exit network instruction by the receiving unit. The G-MS context information includes an ID of a G-MS network management entity. A host exit network request sending unit is configured to send a host exit network request to the G-MS network management entity according to the ID of the G-MS network management entity, where the host exit network request carries the host ID.

Ones of the preceding technical solutions have the following benefits. After receiving a G-MS exit network instruction, the G-MS network management entity provided in an embodiment of the present invention sends host exit network instruction to the network management entity of the host connected to the G-MS to indicate the process in which the host exits from the network and ensure that all hosts connected to the G-MS can exit from the network normally.

Other ones of the preceding technical solutions have the following benefits. After receiving a host exit network instruction, the host network management entity provided in an embodiment of the present invention sends a host exit network request to the network management entity of the host connected to the G-MS to trigger the host to exit from the G-MS network, that is, deleting the host context information, to ensure that the host can exit from the network normally.

DETAILED DESCRIPTION OF ILLUSTRATIVE EMBODIMENTS

A method is provided in an embodiment of the present invention for a multi-host system to exit from the network. The method comprises:

receiving an G-MS exit network instruction;

obtaining the context information relating to the host connected to the G-MS;

sending an host exit network instruction to the host network management entity according to the ID of the host network management entity; and triggering the host to exit from the network.

The obtained host context information includes the ID of the host connected to the G-MS and the ID of the host network management entity. The exit network instruction carries the host ID. The technical solution provided in an embodiment of the present invention enables all hosts connected to the G-MS to exit from the network normally. The following section describes Embodiments 1 and 2. The Authenticator or Host Authentication, Authorization, and Accounting Proxy (AAA Proxy) located at the host is associated with the G-MS authenticator. That is, the host authenticator or host AAA proxy stores the following information: mapping between the host ID and context information relating to the G-MS, to which the host is connected. The G-MS context information includes the G-MS ID and the ID of the G-MS authenticator. In addition, the G-MS authenticator stores the following information: mapping between the G-MS ID and the context information relating to the host, to which the G-MS is connected. The host context information includes the host ID and the ID of the host authenticator or host AAA proxy. In Embodiments 1 and 2 of the present invention, when the G-MS exits from the network, the G-MS authenticator obtains the context information relating to the host connected to the G-MS after receiving a G-MS exit network instruction that contains the G-MS ID according to the mapping between the G-MS ID and the G-MS host context information and sends host exit network instruction to the related host authenticator or host AAA proxy, which initiates the process of disconnecting the host from the network.

In Embodiments 1 to 9 of the present invention, when a host enters the network, the G-MS network management entity stores the mapping between the G-MS ID and the context information relating to the host connected to the G-MS. Accordingly, the host network management entity stores the mapping between the host ID and the context information relating to the host connected to the G-MS for the G-MS network management entity to associate with the host network management entity.

Figure 1:
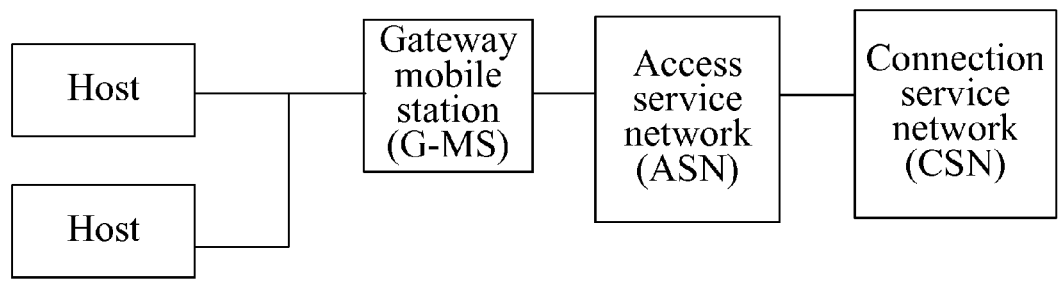
FIG. 1 shows the multi-host WiMAX network infrastructure in the prior art.
Figure 2:
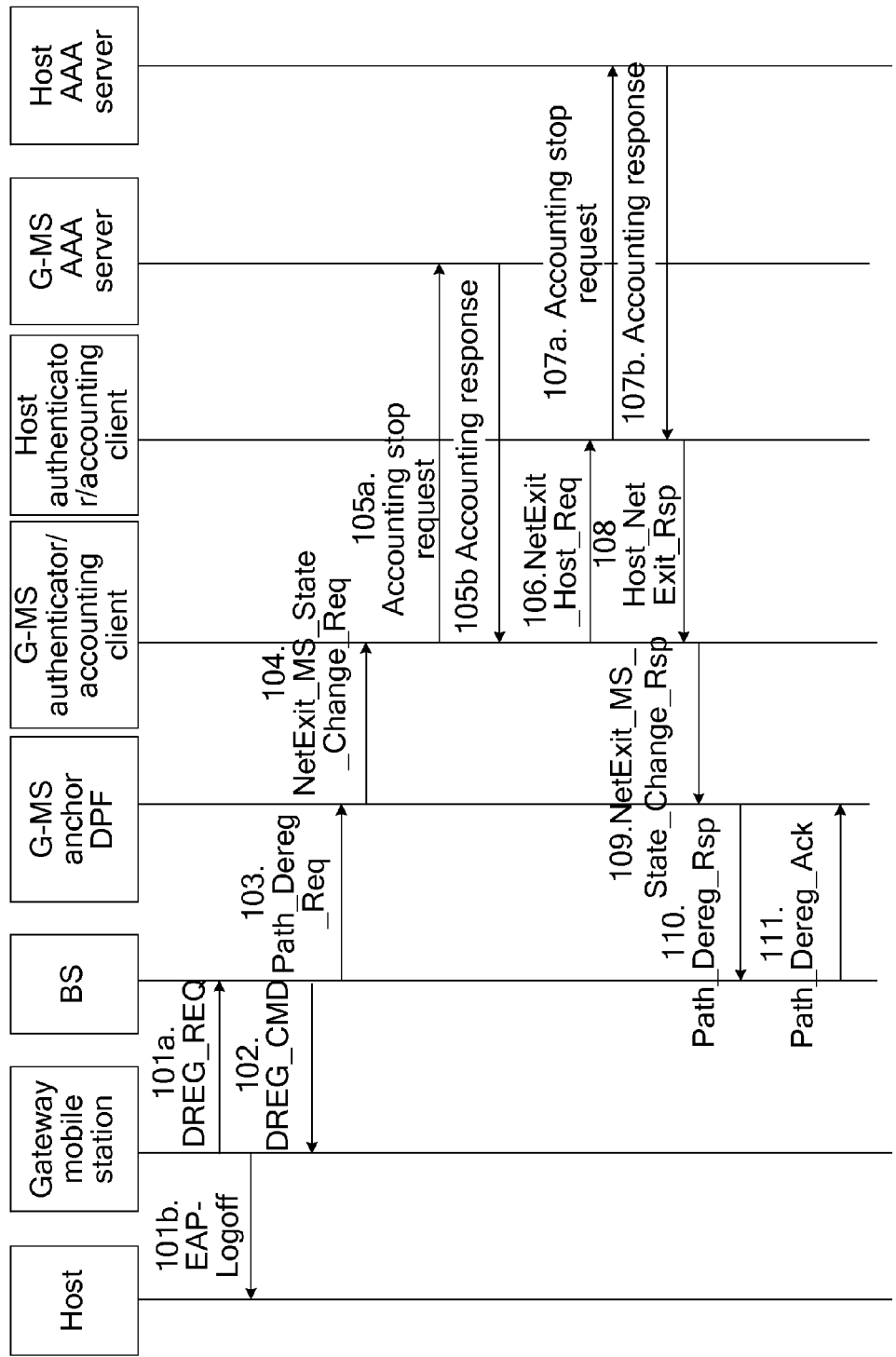
FIG. 2 shows the signaling for a multi-host system to exit network in Embodiment 1 of the present invention.

As shown in FIG. 2, Embodiment 1 of the present invention provides a method of disconnecting a multi-host system from the network. When disconnecting from the network, the G-MS initiates a network exit process. The method will be described now.

Steps 101a-b: The G-MS sends a DREG_REQ 101a to the BS, wherein De-Registration_Request Code=0x00. The G-MS also sends an EAP-Logoff 101b to a host to instruct the host connected to the G-MS to exit from the network. The host exits from the network after receiving the message.

Step 102: After receiving the DREG_REQ, the BS sends DREG_CMD to the G-MS, wherein Action Code=0x04.

Step 103: The BS sends Path_Dereg_Req to the G-MS Anchor DPF (Anchor data path function). The message contains the power down instruction.

Step 104: The G-MS Anchor DPF sends NetExit_MS_State_Change_Req to the G-MS authenticator and instructs the authenticator to delete the G-MS context information, wherein the NetExit_MS_State_Change_Req contains the G-MS ID.

Step 105a-b: The G-MS accounting client, which resides on the same physical entity as the G-MS authenticator, sends an accounting stop request 105a to the G-MS AAA (visited or home AAA) server to indicate G-MS deregistration. The message contains the G-MS context release instruction. The G-MS AAA server releases the G-MS context information and sends an accounting stop response 105b to the G-MS accounting client.

Step 106: According to the mapping between the G-MS ID and the context information relating to the host connected to the G-MS, the G-MS authenticator obtains the context information relating to the host connected to the G-MS. The context information comprises the host ID and the ID of the host network management entity (i.e. the host authenticator or host AAA proxy). According to the ID of the host network management entity, the G-MS authenticator sends NetExit_Host_Req to the host authenticator or host AAA proxy (the figure illustrates the host authenticator). The NetExit_Host_Req message contains the host ID. Further, the G-MS authenticator deletes the mapping between the G-MS ID and the context information relating to the host connected to the G-MS.

Steps 107a-b: According to the host ID, the host authenticator or host AAA proxy deletes the context information relating to the host. The host accounting client, which resides on the same physical entity as the host authenticator or host AAA proxy, namely the host accounting client, sends an accounting stop request 107a to the host AAA (visited or home AAA) server to instruct the host to deregister. The request contains the host ID. The host AAA server releases the context information relating to the host and returns an accounting stop response 107b to the host accounting client. Moreover, the host authenticator or host AAA proxy triggers the host Anchor DPF to release related host's data paths and traffic flow resources and deletes the context information relating to the host (not shown in the figure). The host context information contains the mapping between the host ID and the context information relating to the host connected to the G-MS.

Step 108: The host authenticator or host AAA proxy sends NetExit_Host_Rsp (host exit network response) to the G-MS authenticator.

Step 109: The G-MS authenticator sends NetExit_MS_State_Change_Rsp (MS exit network state update message) to the G-MS Anchor DPF.

Step 110: The G-MS Anchor DPF sends Path_Dereg_Rsp (data path registration response) to the BS.

Step 111: The BS sends Path_Dereg_Ack (data path registration ACK) to the G-MS anchor DPF.

Figure 3:
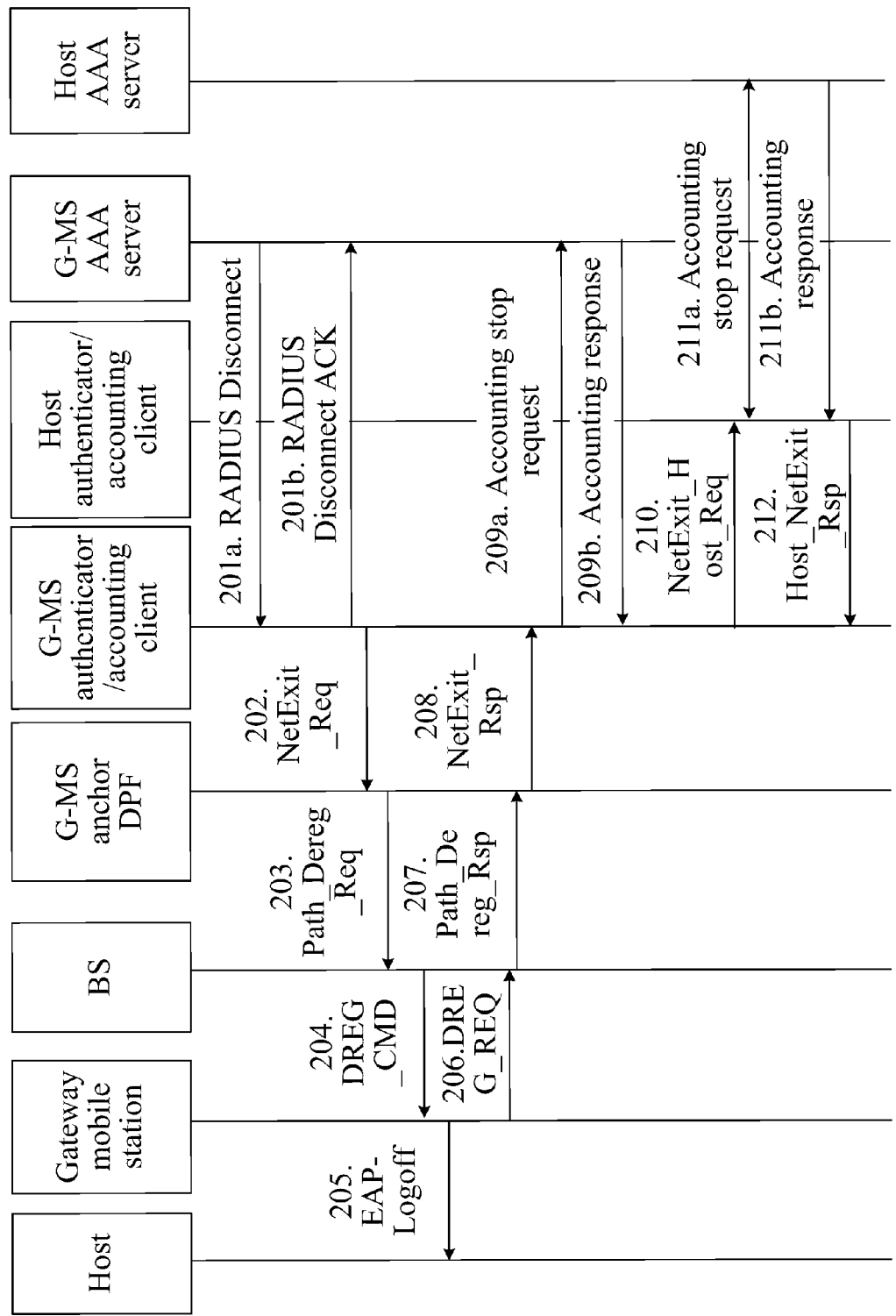
FIG. 3 shows the signaling for a multi-host system to exit network in Embodiment 2 of the present invention.

As shown in FIG. 3, Embodiment 2 of the present invention provides a method of disconnecting a multi-host system from the network. When disconnecting from the network, the G-MS network entity (G-MS AAA server) initiates the processing of disconnecting the G-MS from the network. The method will be described now.

Steps 201a-b: The G-MS AAA server sends RADIUS (Remote Authentication Dial In User Service) Disconnect message 201a to the G-MS authenticator. The RADIUS Disconnect message carries the G-MS flag, which can be the G-MS ID. The G-MS authenticator returns RADIUS Disconnect Ack 201b to the G-MS AAA server.

Step 202: The G-MS authenticator sends NetExit_Req to the G-MS Anchor DPF.

Step 203: The G-MS Anchor DPF sends Path_Dereg_Req (data path registration request) to the BS. The request contains power down instruction.

Step 204: The BS sends DREG_CMD to the G-MS, wherein Action Code=0x00.

Step 205: The G-MS sends EAP-Logoff to the host to notify the host that the G-MS will exit from the network.

Step 206: The G-MS sends DREG_REQ to the BS, wherein De-Registration_Request Code=0x02.

Step 207: The BS sends Path_Dereg_Rsp to the G-MS anchor DPF.

Step 208: The G-MS Anchor DPF sends NetExit_Rsp to the G-MS authenticator.

Steps 209a-b, 210, 211a-211b, and 212 are the same as corresponding steps in the Steps 105-108 discussed above.

The following section describes Embodiment 3 of the present invention. The host anchor DPF (located at the anchor ASN-GW) is associated with the G-MS anchor DPF. That is, the host anchor DPF stores the mapping between the host ID and the context information relating to the host connected to the G-MS. The context information contains the G-MS ID and the ID of the G-MS anchor DPF. In addition, the G-MS anchor DPF stores the G-MS ID and the context information relating to the host connected to the G-MS. The context information contains the ID of the host connected to the G-MS and the anchor DPF ID of the host network management entity. When the G-MS exits from the network, the G-MS anchor DPF, after receiving a G-MS exit network instruction (containing the G-MS ID), obtains the G-MS context information and sends G-MS exit network instruction to the anchor DPF of the host connected to the G-MS. The related anchor DPF initiates a process of deregistering the host from the network.

Figure 4:
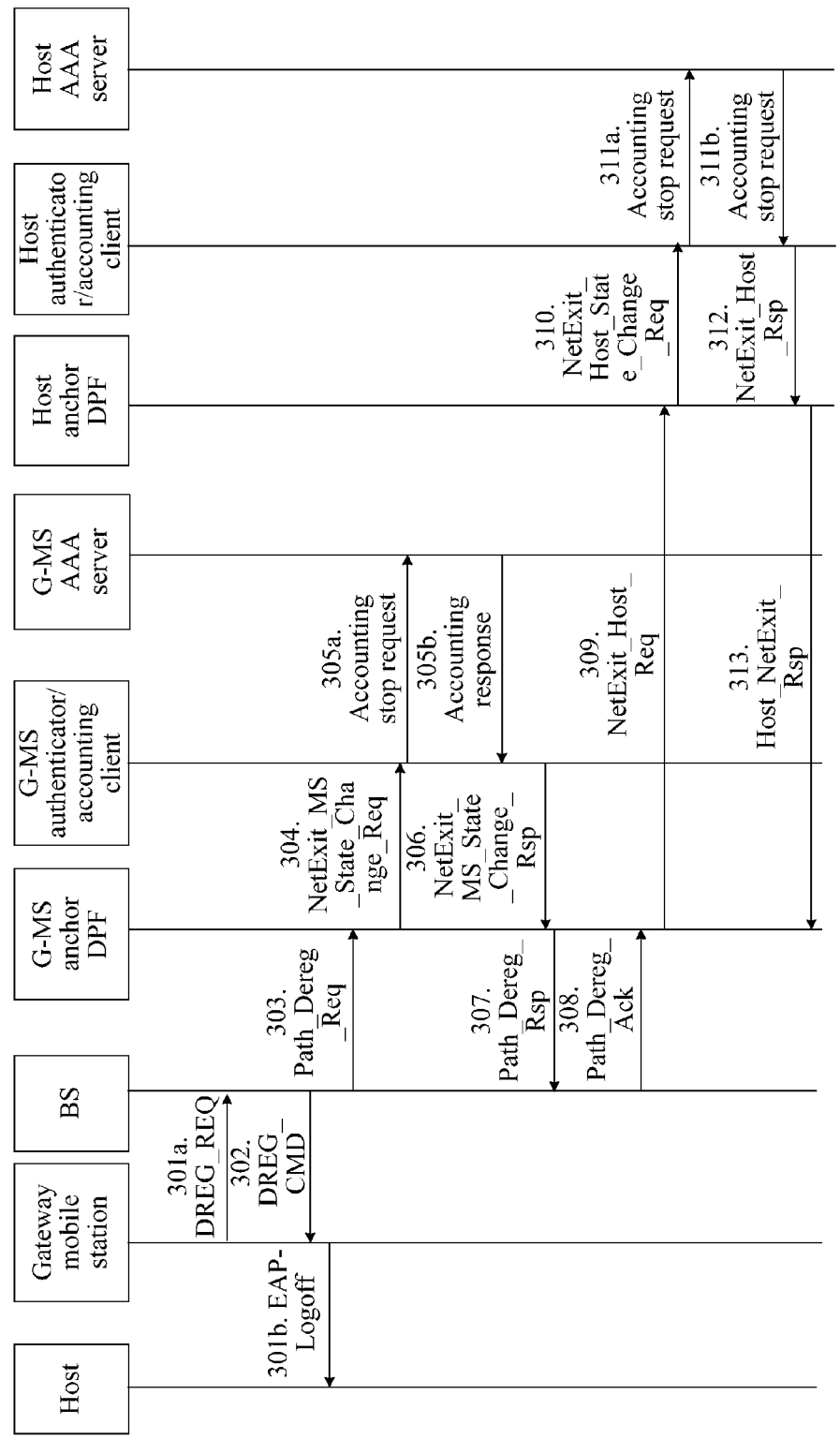
FIG. 4 shows the signaling for a multi-host system to exit network in Embodiment 3 of the present invention.

As shown in FIG. 4, Embodiment 3 of the present invention provides a method of disconnecting a multi-host system from the network. When disconnecting from the network, the G-MS initiates a network exit process. The method will be described now.

Steps 301a-b: The G-MS sends a DREG_REQ 301a to the BS, wherein De-Registration_Request Code=0x00. The G-MS also sends an EAP-Logoff 301b to a host to instruct the host connected to the G-MS to exit from the network.

Step 302: After receiving the DREG_REQ, the BS sends DREG_CMD to the G-MS, wherein Action Code=0x04.

Step 303: The BS sends Path_Dereg_Req to the G-MS Anchor DPF (Anchor data path function). The message contains the power down instruction and G-MS ID.

Step 304: The G-MS anchor DPF sends NetExit_MS_State_Change_Req to the G-MS authenticator to instruct G-MS authenticator to delete G-MS context information.

Steps 305a-b: The G-MS accounting client, which resides on the same physical entity as the G-MS authenticator, sends an accounting stop request 305a to the G-MS AAA (visited or home AAA) server to indicate G-MS deregistration. The message contains the G-MS context release instruction. The G-MS AAA server releases the G-MS context information. The G-MS AAA server returns an accounting response 305b.

Step 306: The G-MS authenticator sends NetExit_MS_State_Change_Rsp to the G-MS Anchor DPF.

Step 307: The G-MS Anchor DPF sends Path_Dereg_Rsp (data path registration response) to the BS.

Step 308: The BS sends R6 Path_Dereg_Ack (data path registration ACK) to the anchor DPF.

Step 309: According to the mapping between the G-MS ID and the context information relating to the host connected to the G-MS, the G-MS anchor obtains the context information relating to the host connected to the G-MS. The context information comprises the host ID and the ID of the host network management entity (host anchor DPF), the G-MS anchor DPF sends NetExit_Host_Req to the host anchor DPF. The NetExit_Host_Req message contains the host ID. Further, the G-MS anchor DPF deletes the mapping between the G-MS ID and the context information relating to the host connected to the G-MS.

Step 310: After receiving the message, the host anchor DPF sends NetExit_Host_State_Change_Req to the host authenticator or host AAA proxy to delete the G-MS context information (shown in the figure). At the same time, the host anchor DPF releases the related host data path and traffic flow resources and deletes the context information, which comprises the mapping between the host ID and the context information relating to the host connected to the G-MS.

Steps 311a-b: The host accounting client, which resides on the same physical entity as the host authenticator or host AAA proxy, sends an accounting stop request 311a to the host AAA (visited or home AAA) server to indicate host deregistration. The message contains the host context release instruction. The host AAA server releases the host context information. The AAA server returns an accounting response 311b.

Step 312: The host authenticator or host AAA proxy sends NetExit_Host_Rsp to the host anchor DPF.

Step 313: The host Anchor DPF returns NetExit_Rsp to the G-MS anchor DPF.

Similarly, the host anchor DPF is associated with the G-MS anchor DPF. Therefore, the G-MS network can initiate the process of disconnecting G-MS from the network. The process is triggered in the same way as described in Steps 201-209 in Embodiment 2. No more details will be given herein.

After receiving a G-MS exit network instruction, the G-MS authenticator or G-MS anchor DPF provided in an earlier embodiment of the present invention sends host exit network instruction to the network management entity of the host connected to the G-MS to indicate the process in which the host exits from the network and ensure that all hosts connected to the G-MS can exit from the network normally.

A method is provided in later embodiments of the present invention for a multi-host system to exit from the network. In this embodiment method, a G-MS exit network instruction is received. Context information relating to the host connected to the G-MS is obtained. A host exit network instruction is sent to the host network management entity according to the ID of the host network management entity and the host is triggered to exit from the network.

The obtained host context information includes the ID of the host connected to the G-MS and the ID of the host network management entity. The exit network instruction carries the host ID. The technical solution provided in an embodiment of the present invention enables the host to exit from the network normally.

The following section describes Embodiments 4 to 7. The host authenticator or host AAA proxy is associated with the G-MS authenticator. The host authenticator or host AAA proxy stores the mapping between the host ID and context information relating to the G-MS to which the host is connected. The G-MS context information includes the G-MS ID and the ID of the G-MS authenticator. In addition, the G-MS authenticator stores the mapping between the G-MS ID and the context information relating to the host, to which the G-MS is connected. The host context information includes the host ID and the ID of the host authenticator or host AAA proxy. In Embodiments 4 to 7 of the present invention, after receiving a host exit network request (containing the host ID), the host authenticator or host AAA proxy obtains the context information relating to the host connected to the G-MS according to the mapping between the host ID and the context information relating to the host connected to the G-MS and sends a host exit network request to the related G-MS authenticator, which deletes the host context information relating to the G-MS.

Figure 5:
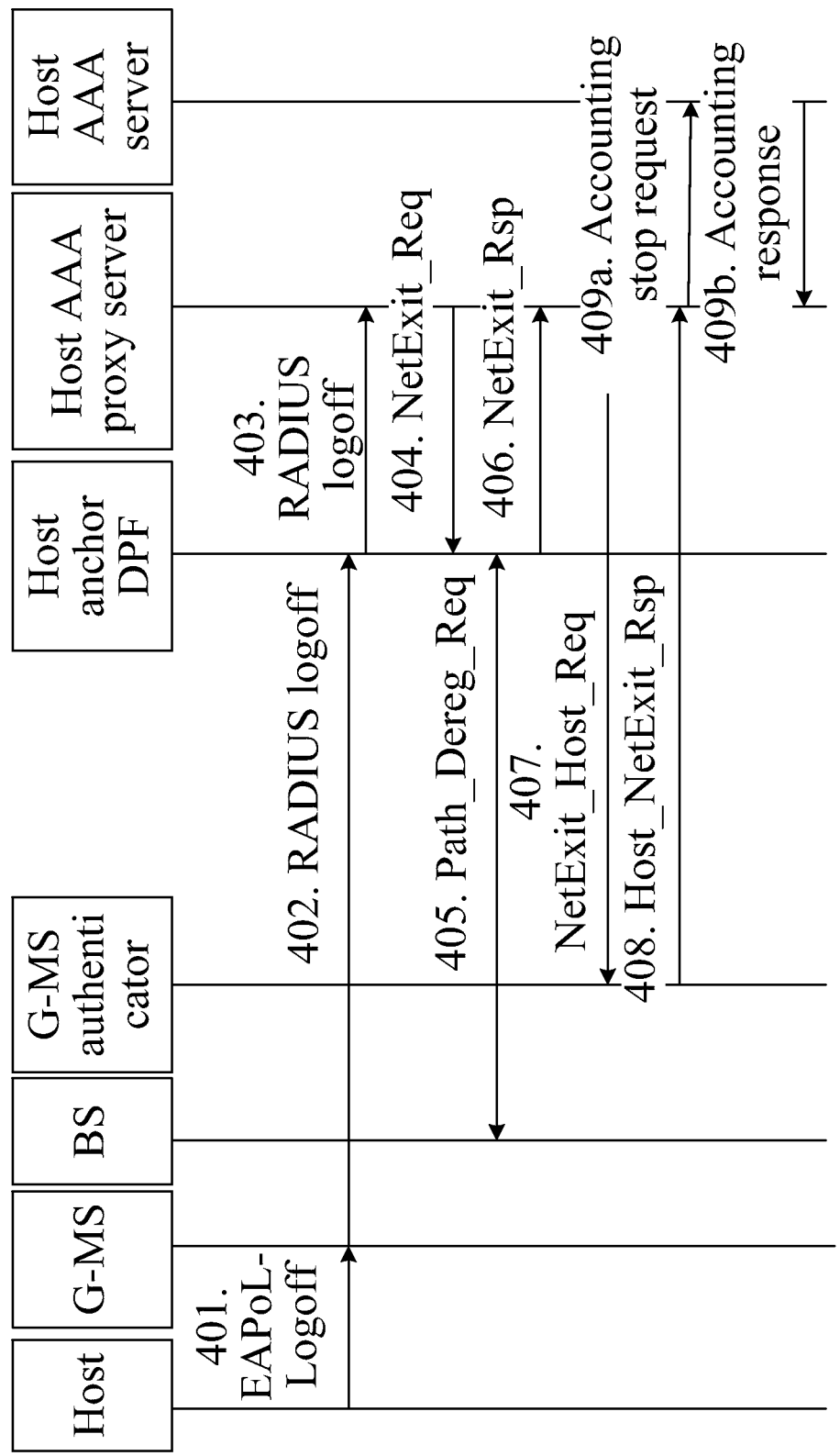
FIG. 5 shows the signaling for a multi-host system to exit network in Embodiment 4 of the present invention.

As shown in FIG. 5, Embodiment 4 of the present invention provides a method of disconnecting a multi-host system from the network. When disconnecting from the network, the host initiates a network exit process. The host AAA proxy is associated with the G-MS authenticator. The method will now be described.

Step 401: The host sends EAPoL-Logoff (LAN-based EAP exit network request) to the G-MS.

Step 402: When receiving the EAPoL-Logoff, the G-MS sends RADIUS logoff to the host anchor DPF. The RADIUS logoff message carries the ID of the host that initiates the network exit process.

Step 403: The host anchor DPF finds the related host AAA proxy according to the host ID and forwards the RADIUS logoff message to the host AAA proxy.

Step 404: The host AAA proxy sends NetExit_Req to the host anchor DPF, instructs the host anchor DPF to exit from the network and triggers an IP address release process.

Step 405: The host anchor DPF sends a data path deregistration process to the BS.

Step 406: After data path deregistration, the host anchor DPF sends NetExit_Rsp to the host AAA proxy.

Step 407: According to the mapping between the host ID and the context information relating to the host connected to the G-MS, the host AAA proxy obtains the context information relating to the G-MS, to which the host is connected. The context information comprises the G-MS ID and the G-MS authenticator ID. According to the ID of the G-MS authenticator, the host AAA proxy sends NetExit_Host_Req to the related G-MS authenticator to notify that the host will exit from the network. The NetExit_Host_Req message contains the G-MS ID and host ID. Further, the host AAA proxy deletes the mapping between the host ID and the context information relating to the G-MS, to which the host is connected.

Step 408: After receiving Host_NetExit_Req, the G-MS authenticator finds the G-MS context information according to the G-MS ID, searches the context information for the host context according to the host ID, deletes the host context information, and returns Host_NetExit_Rsp to the host AAA proxy.

Of course, the Host_NetExit_Req message described in the preceding Step 407 can forgo G-MS ID. In Step 408, the G-MS authenticator searches for host context information according to the host ID without affecting the realization of the present invention.

Steps 409*a-b*: The host accounting client, which resides on the same physical entity as the host authenticator or host AAA proxy, sends an accounting stop request 409*a* to the host AAA (visited or home AAA) server to indicate host deregistration. The message contains the host context release instruction. The host AAA server releases the host context information and returns an accounting stop response 409*b*.

Figure 6:
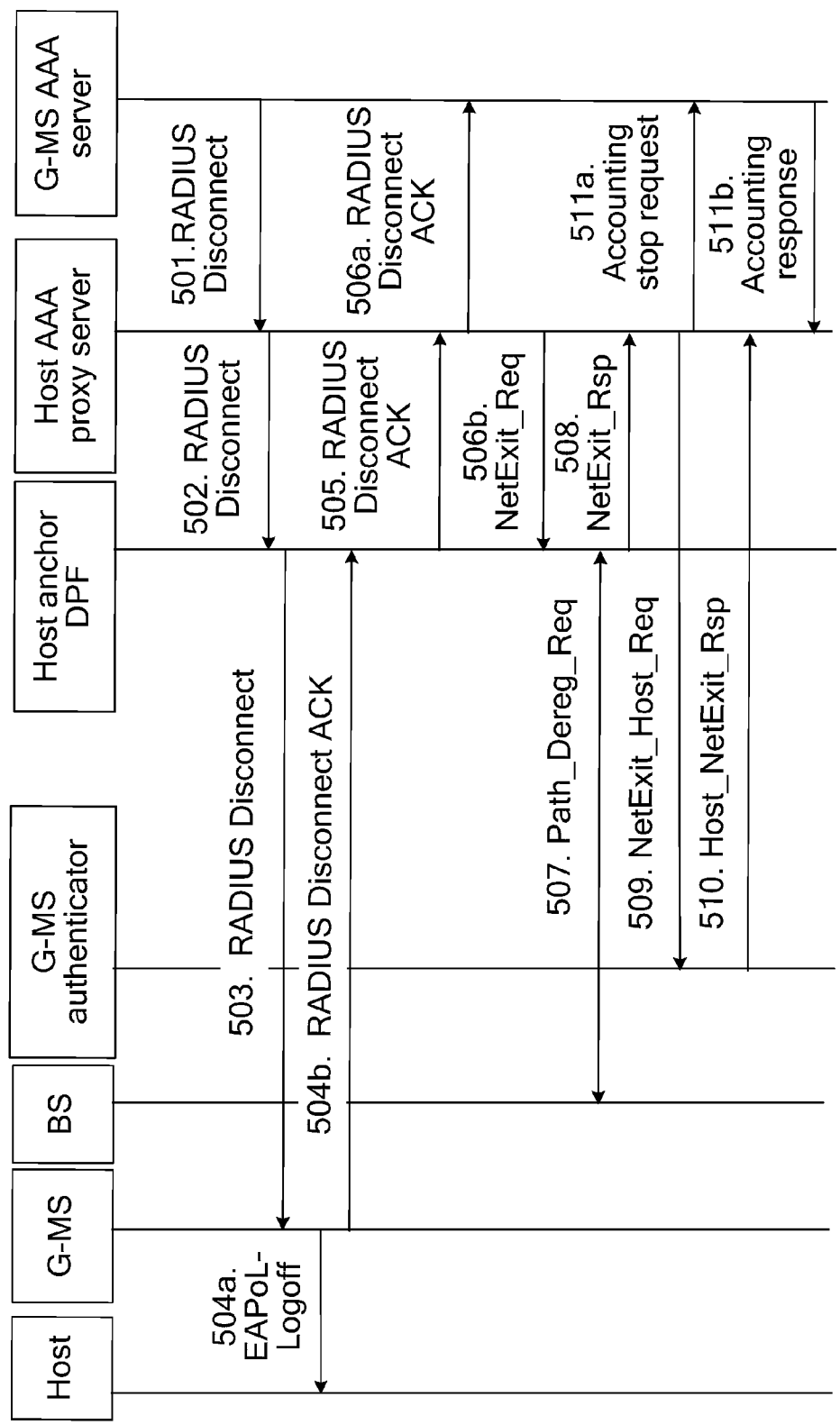
FIG. 6 shows the signaling for a multi-host system to exit network in Embodiment 5 of the present invention.

As shown in FIG. 6, Embodiment 5 of the present invention provides a method of disconnecting a multi-host system from the network. When disconnecting from the network, the host AAA server initiates a network exit process. The host AAA proxy is associated with the G-MS authenticator. The method will be described now.

Step 501: The host AAA server sends RADIUS Disconnect to the host AAA proxy. The RADIUS Disconnect message carries the host ID.

Step 502: The host AAA proxy sends the RADIUS Disconnect message to the host anchor DPF.

Step 503: The host anchor DPF sends the RADIUS Disconnect message to the G-MS.

Steps 504*a-b*: After receiving the RADIUS Disconnect message, the G-MS sends EAPoL-Logoff 504*a* to the host and returns RADIUS Disconnect ACK 504*b* to the host anchor DPF.

Step 505: The host anchor DPF finds the related host AAA proxy according to the host ID and forwards the RADIUS Disconnect ACK message to the host AAA proxy.

Steps 506*a-b*: The host AAA proxy sends RADIUS Disconnect Ack 506*a* to the host AAA server and NetExit_Req 506*b* to the host anchor DPF, instructing the host anchor DPF to disconnect the host and triggering an IP address release process.

Step 507: The host anchor DPF sends a data path registration process to the BS.

Step 508: After data path deregistration, the host anchor DPF returns NetExit_Rsp to the host AAA proxy.

Step 509: According to the mapping between the host ID and the context information relating to the host connected to the G-MS, the host AAA proxy obtains the context information relating to the G-MS, to which the host is connected. The context information comprises the G-MS ID and the G-MS authenticator ID. According to the ID of the G-MS authenticator, the host AAA proxy sends NetExit_Host_Req to the related G-MS authenticator to notify that the host will exit from the network. The NetExit_Host_Req message contains the G-MS ID and host ID. Further, the host AAA proxy deletes the mapping between the host ID and the context information relating to the G-MS, to which the host is connected.

Step 510: After receiving Host_NetExit_Req, the G-MS authenticator finds the G-MS context information according to the G-MS ID, searches the context information for the host context according to the host ID, deletes the host context information, and returns Host_NetExit_Rsp to the host AAA proxy.

Of course, the Host_NetExit_Req message described in the preceding Step 509 can forgo G-MS ID. In Step 510, the G-MS authenticator searches for host context information according to the host ID without affecting the realization of the present invention.

Steps 511a-b: The host accounting client, which resides on the same physical entity as the host authenticator or host AAA proxy, sends an accounting stop request 511a to the host AAA (visited or home AAA) server to indicate host deregistration. The message contains the host context release instruction. The host AAA server releases the host context information and returns an accounting stop response 511b.

Figure 7:
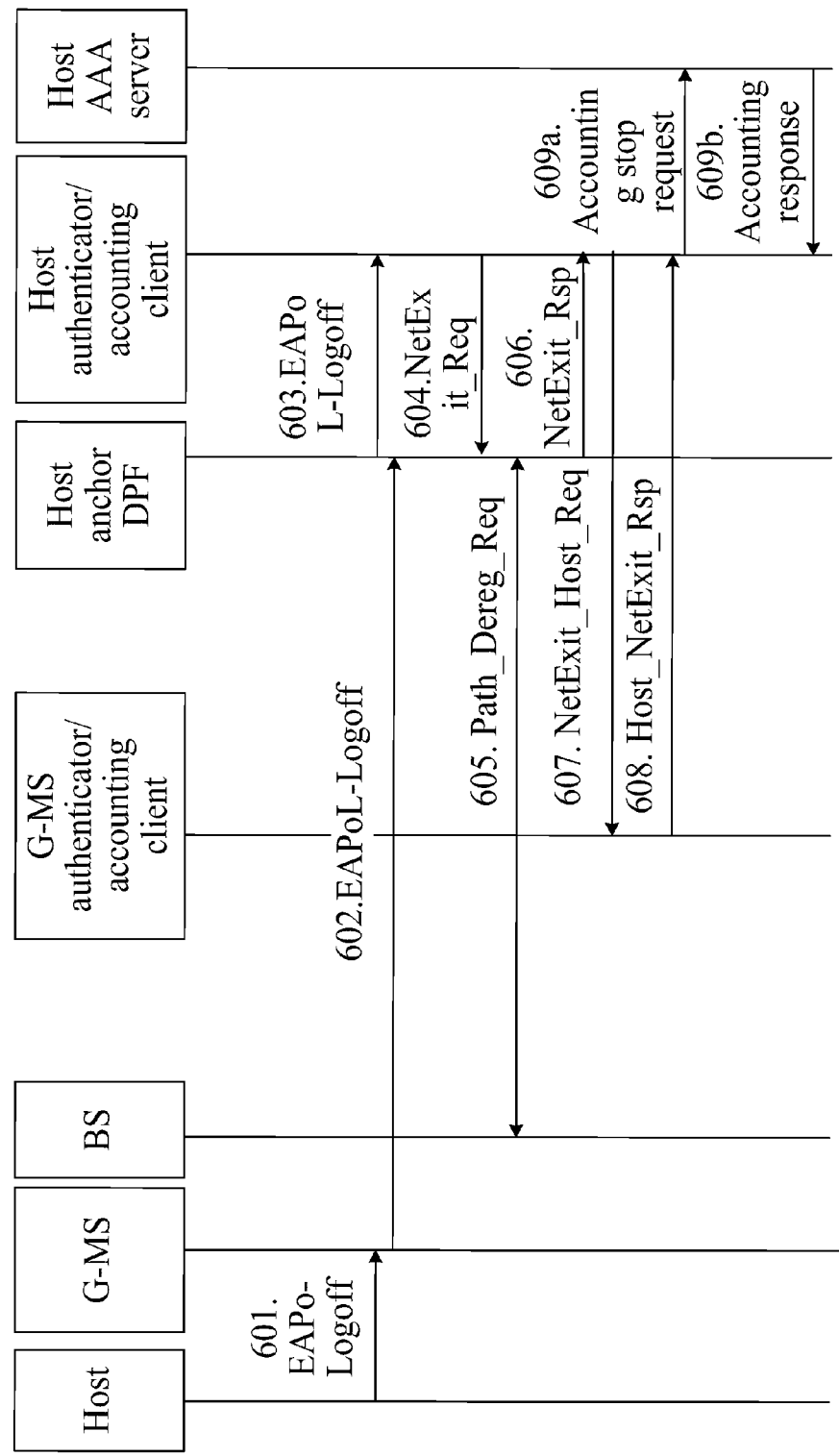
FIG. 7 shows the signaling for a multi-host system to exit network in Embodiment 6 of the present invention.

As shown in FIG. 7, Embodiment 4 of the present invention provides a method of disconnecting a multi-host system from the network. This method applies to the Ethernet-Convergence SubLayer (ETH-CS). The host authenticator is associated with the G-MS authenticator. When disconnecting from a network, the host initiates a network exit process. The method will be described now.

Step 601: The host sends EAPoL-Logoff (LAN-based EAP exit network request) to the G-MS.

Step 602: The G-MS forwards the message to the host anchor DPF, wherein the EAPoL-Logoff message contains the ID of the host that initiates a network exit process.

Step 603: The host anchor DPF finds the related host authenticator according to the host ID and forwards EAPoL-Logoff to the host authenticator.

Step 604: The host authenticator sends NetExit_Req to the host anchor DPF, instructs the host anchor DPF to exit from the network and triggers the IP address release process.

Step 605: The host anchor DPF sends a data path registration process to the BS.

Step 606: After data path deregistration, the host anchor DPF returns NetExit_Rsp to the host authenticator.

Step 607: According to the mapping between the host ID and the context information relating to the host connected to the G-MS, the host authenticator obtains the context information relating to the G-MS, to which the host is connected. The context information comprises the G-MS ID and the G-MS authenticator ID. According to the ID of the G-MS authenticator, the host AAA proxy sends NetExit_Host_Req to the related G-MS authenticator to notify that the host will exit from the network. The NetExit_Host_Req message contains the G-MS ID and host ID. Further, the host authenticator deletes the mapping between the host ID and the context information relating to the G-MS, to which the host is connected.

Step 608: After receiving Host_NetExit_Req, the G-MS authenticator deletes the context information relating to the host connected to the G-MS and returns Host_NetExit_Rsp to the host authenticator.

Steps 609a-b: The host accounting client, which resides on the same physical entity as the host authenticator, sends an accounting stop request 609a to the host AAA (visited or home AAA) server to indicate host deregistration. The message contains the host context release instruction. The host AAA server releases the host context information and returns an accounting stop response 609b to the accounting client.

Figure 8:
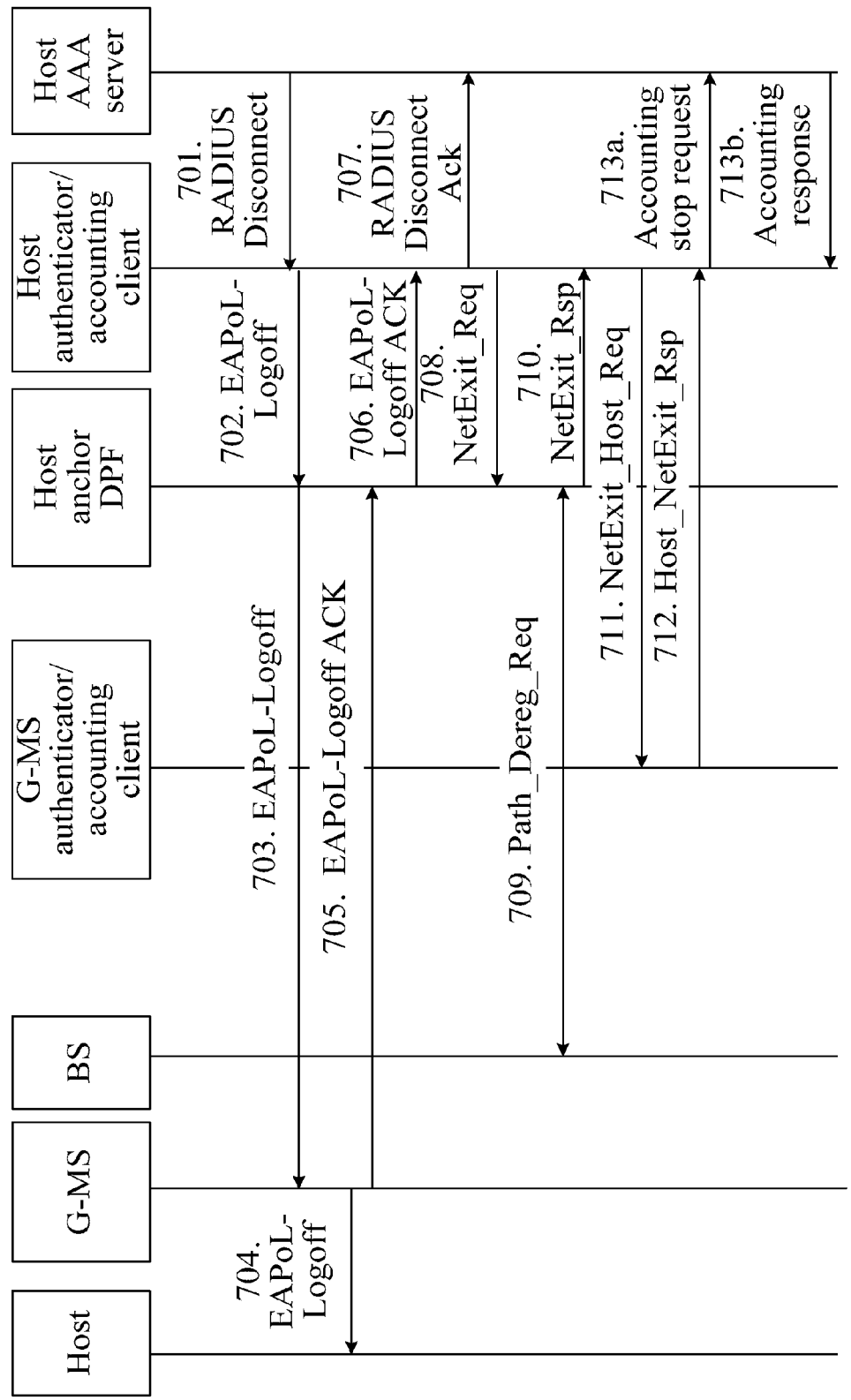
FIG. 8 shows the signaling for a multi-host system to exit network in Embodiment 7 of the present invention.

As shown in FIG. 8, Embodiment 7 of the present invention provides a method of disconnecting a multi-host system from the network. This method applies to the Ethernet-Convergence SubLayer (ETH-CS). The host authenticator is associated with the G-MS authenticator. When disconnecting from a network, the host initiates a network exit process (this embodiment takes the host AAA server as an example). The method will be described now.

Step 701: The host AAA server sends RADIUS Disconnect to the host authenticator. The RADIUS Disconnect message carries the host ID.

Step 702: The host authenticator translates RADIUS Disconnect into an EAPoL-Logoff request through the host context information it has maintained and sends the request to the host anchor DPF.

Step 703: The host anchor DPF sends the EAPoL-Logoff message to the G-MS.

Step 704: The G-MS sends the EAPoL-Logoff message to the host and instructs the host to exit from the network.

Step 705: The G-MS sends EAPoL-Logoff ACK to the host.

Step 706: The host anchor DPF sends EAPoL-Logoff ACK to the host authenticator.

Step 707: The host authenticator returns the RADIUS Disconnect ACK message to the host AAA server.

Step 708: The host authenticator sends NetExit_Req to the host anchor DPF, instructs the host anchor DPF to exit from the network and triggers the IP address release process.

Step 709: The host anchor DPF sends a data path registration process to the BS.

Step 710: After data path deregistration, the host anchor DPF returns NetExit_Rsp to the host authenticator.

Step 711: According to the mapping between the host ID and the context information relating to the host connected to the G-MS, the host authenticator obtains the context information relating to the G-MS, to which the host is connected. The context information comprises the G-MS ID and the G-MS authenticator ID. According to the ID of the G-MS authenticator, the host AAA proxy sends NetExit_Host_Req to the related G-MS authenticator to notify that the host will exit from the network. The NetExit_Host_Req message contains the G-MS ID and host ID. Further, the host authenticator deletes the mapping between the host ID and the context information relating to the G-MS, to which the host is connected.

Step 712: After receiving Host_NetExit_Req, the G-MS authenticator deletes the context information relating to the host connected to the G-MS and returns Host_NetExit_Rsp to the host authenticator.

Steps 713a-b: The host accounting client, which resides on the same physical entity as the host authenticator or host AAA proxy, sends an accounting stop request 713a to the host AAA (visited or home AAA) server to indicate host deregistration. The message contains the host context release instruction. The host AAA server releases the host context information and returns an accounting stop response 713b.

The following section describes Embodiments 8 and 9 of the present invention. The host anchor DPF (located at the anchor ASN-GW) is associated with the G-MS anchor DPF. That is, the host anchor DPF stores the mapping between the host ID and the context information relating to the host connected to the G-MS. The context information contains the G-MS ID and the ID of the G-MS anchor DPF. In addition, the G-MS anchor DPF stores the G-MS ID and the context information relating to the host connected to the G-MS. The context information comprises the G-MS ID and the anchor DPF ID of the host network management entity. At the same time, the G-MS anchor DPF stores the G-MS ID and the G-MS context information, wherein the G-MS context information comprises the ID of the host connected to the G-MS and the ID of the host anchor DPF. When the host exits from the network, the host anchor DPF, after receiving a host exit network instruction, obtains the G-MS context information according to the mapping between the host ID and the context information relating to the G-MS, to which the host is connected, and sends host exit network instruction to the anchor DPF of the G-MS.

Figure 9:
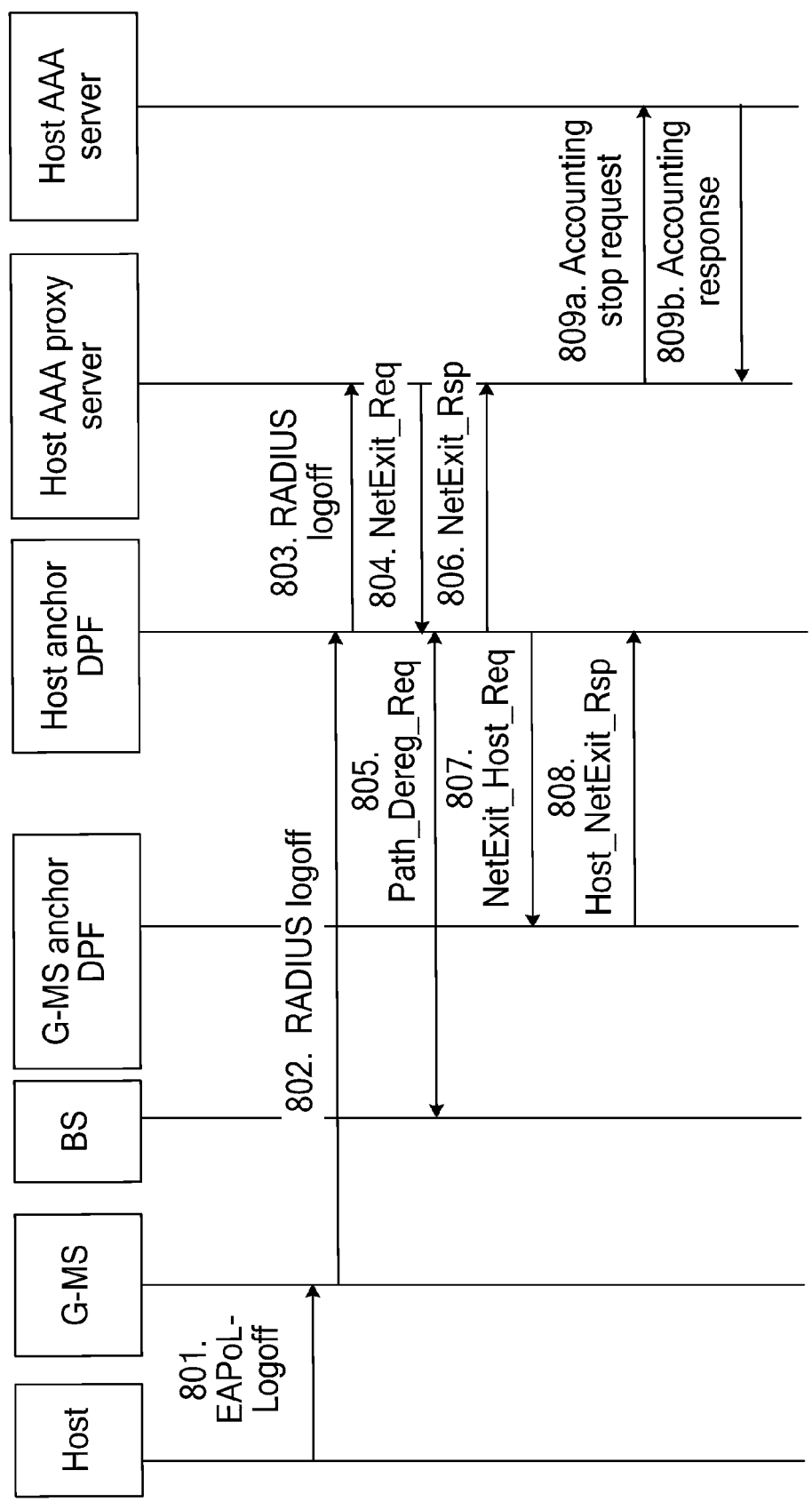
FIG. 9 shows the signaling for a multi-host system to exit network in Embodiment 8 of the present invention.

As shown in FIG. 9, Embodiment 8 of the present invention provides a method of disconnecting a multi-host system from the network. When disconnecting from the network, the host initiates a network exit process. The method will be described now.

Step 801: The host sends EAPoL-Logoff to the G-MS.

Step 802: When receiving the EAPoL-Logoff, the G-MS sends RADIUS logoff to the host anchor DPF. The RADIUS logoff message carries the host ID.

Step 803: The host anchor DPF finds the related host AAA proxy according to the host ID and forwards the RADIUS logoff message to the host AAA proxy.

Step 804: The host AAA proxy sends NetExit_Req to the host anchor DPF, instructs the host anchor DPF to exit from the network and triggers an IP address release process.

Step 805: The host anchor DPF sends a data path registration process to the BS.

Step 806: After data path deregistration, the host anchor DPF returns NetExit_Rsp to the host AAA proxy.

Step 807: According to the mapping between the host ID and the context information relating to the host connected to the G-MS, the host anchor DPF obtains the context information relating to the G-MS, to which the host is connected. The context information comprises the G-MS ID and the G-MS anchor DPF ID. According to the ID of the G-MS anchor DPF, the host anchor DPF sends Host_NetExit_Req to the G-MS anchor DPF to notify the G-MS anchor PDF that the host will exit from the network. The Host_NetExit_Req message contains the G-MS ID and host ID. Moreover, the host anchor DPF deletes the mapping between the host ID and the context information relating to the G-MS, to which the host is connected.

Step 808: After receiving Host_NetExit_Req, the G-MS anchor deletes the context information relating to the host connected to the G-MS and returns Host_NetExit_Rsp to the host anchor DPF.

Steps 809a-b: The host accounting client, which resides on the same physical entity as the host AAA proxy, sends an accounting stop request 809a to the host AAA (visited or home AAA) server to indicate host deregistration. The message contains the host context release instruction. The host AAA server releases the host context information and returns an accounting stop response 809b to the accounting client.

Similarly, the host anchor DPF is associated with the G-MS anchor DPF. Therefore, the host network entity (such as the host AAA server) can initiate the process of disconnecting the host from the network. The process is triggered in the same way as described in Steps 501-508. No more details will be given herein.

Figure 10:
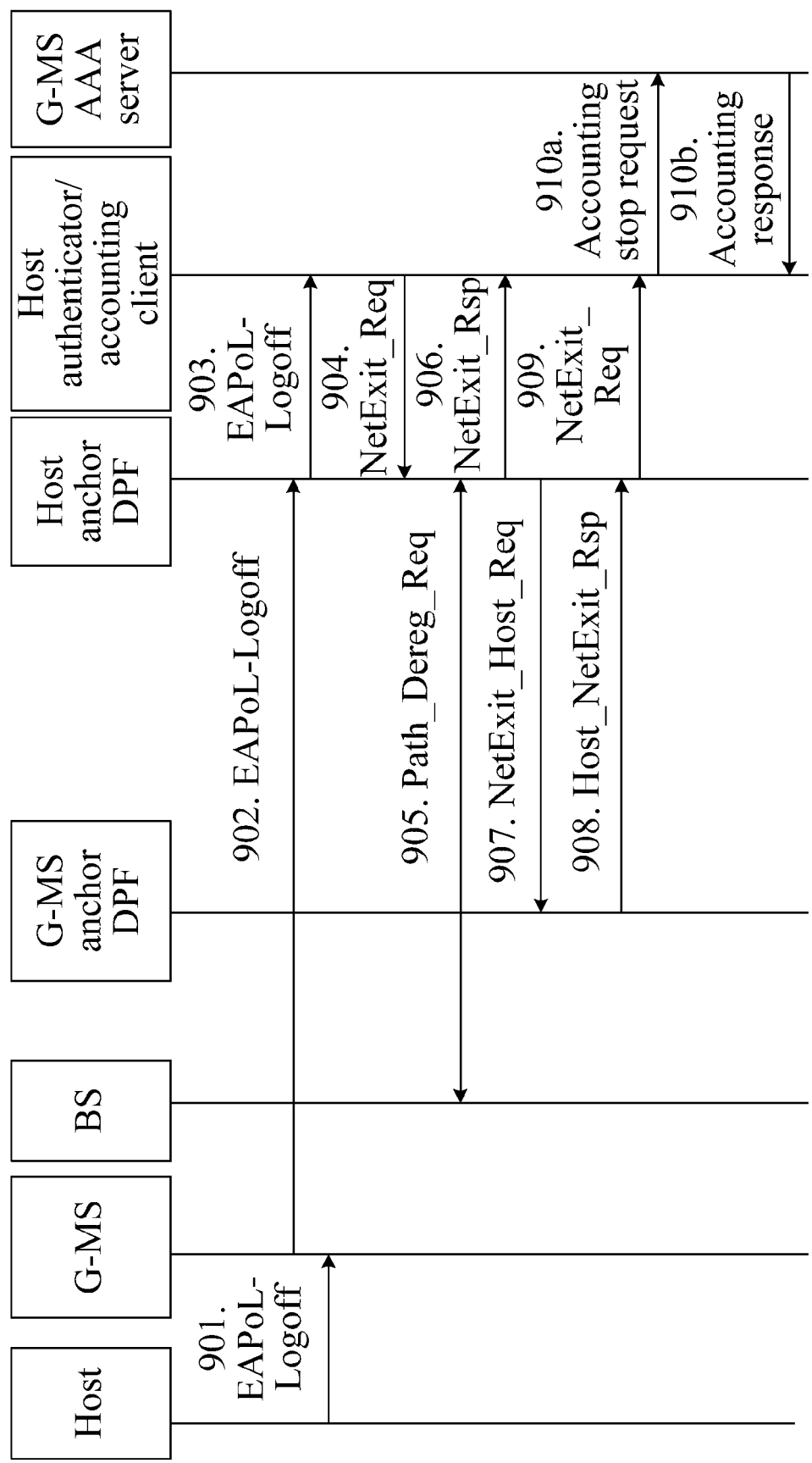
FIG. 10 shows the signaling for a multi-host system to exit network in Embodiment 9 of the present invention.

As shown in FIG. 10, Embodiment 9 of the present invention provides a method of disconnecting a multi-host system from the network. This method applies to the Ethernet-Convergence SubLayer (ETH-CS). The host authenticator is associated with the G-MS authenticator. When disconnecting from a network, the host initiates a network exit process. The method will be described now.

Step 901: The host sends EAPoL-Logoff to the G-MS.

Step 902: After receiving EAPoL-Logoff, the G-MS forwards the message to the host anchor DPF, wherein the EAPoL-Logoff message contains the ID of the host that initiates a network exit process.

Step 903: The host anchor DPF finds the related host authenticator according to the host ID and forwards EAPoL-Logoff to the host authenticator.

Step 904: The host authenticator sends NetExit_Req to the host anchor DPF, instructs the host anchor DPF to exit from the network and triggers the IP address release process.

Step 905: The host anchor DPF sends a data path registration process to the BS.

Step 906: After data path deregistration, the host anchor DPF returns NetExit_Rsp to the host authenticator.

Step 907: According to the mapping between the host ID and the context information relating to the host connected to the G-MS, the host anchor DPF obtains the context information relating to the G-MS, to which the host is connected. The context information comprises the G-MS ID and the G-MS anchor DPF ID. According to the ID of the G-MS anchor DPF, the host anchor DPF sends Host_NetExit_Req to the G-MS anchor DPF to notify the G-MS anchor PDF that the host will exit from the network. The Host_NetExit_Req message contains the G-MS ID and host ID. Further, the host anchor DPF deletes the mapping between the host ID and the context information relating to the G-MS, to which the host is connected.

Step 908: After receiving Host_NetExit_Req, the G-MS anchor deletes the context information relating to the host connected to the G-MS and returns Host_NetExit_Rsp to the host anchor DPF.

Step 909: After data path deregistration, the host anchor DPF sends NetExit_Rsp to the host authenticator.

Steps 910a-b: The authenticator sends an accounting stop request 910a to the host AAA (visited or home AAA) server to indicate host deregistration. The message contains the host context release instruction. The host AAA server releases the host context information and returns an accounting stop response 910b to the accounting client.

Similarly, the host anchor DPF is associated with the G-MS anchor DPF. Therefore, the host network entity (such as the host AAA server) can initiate the process of disconnecting the host from the network. The process is triggered in the same way as described in Steps 701-710. No more details will be given herein.

After receiving a host exit network instruction, the host network management entity (host authenticator, host AAA proxy or host anchor DPF) provided in an embodiment of the present invention sends a host exit network request to the network management entity of the host connected to the G-MS to trigger the host to exit from the G-MS network, that is, deleting the host context information, to ensure that the host can exit from the network normally.

Those skilled in the art can understand that the procedures discussed earlier can be implemented by programs that send instructions to hardware. Such programs can be stored on computer readable storage media, such as read-only memory, disk or CD-ROM.

Figure 11:
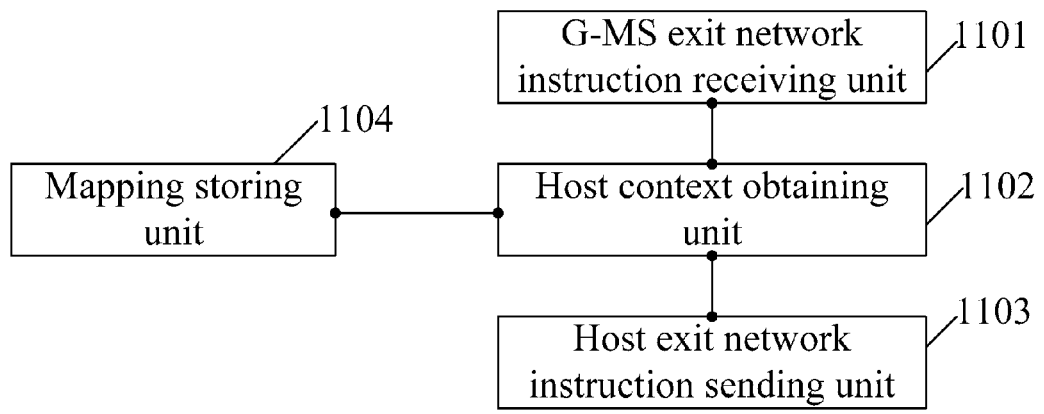
FIG. 11 shows the G-MS network management device provided in Embodiment 10 of the present invention.

As shown in FIG. 11, a G-MS network management device is provided in an embodiment 10 of the present invention. A G-MS exit network instruction receiving unit 1101 is configured to receive G-MS exit network instructions. The G-MS exit network instruction contains the G-MS ID. A host context obtaining unit 1102 is configured to obtain context information relating to the host connected to the G-MS after receiving a G-MS exit network instruction from the G-MS exit network instruction receiving unit 1101. The obtained host context information comprises the ID of the host connected to the G-MS and the ID of the host network management entity.

A host exit network instruction sending unit 1103 is configured to send a host exit network instruction to the host network management entity according to the ID of the network management entity to trigger the disconnecting process of the host. The host exit network instruction carries the host ID.

The device further comprises mapping storing unit 1104 is configured to store the mapping between the G-MS ID and the context information relating to the host, which is connected to the G-MS.

The host context obtaining unit 1102 is configured to obtain context information relating to the host connected to the G-MS according to the mapping stored in the mapping storing unit 1104 between the G-MS ID and the context information relating to the host connected to the G-MS. The obtained host context information comprises the ID of the host connected to the G-MS and the ID of the host network management entity.

Figure 12:
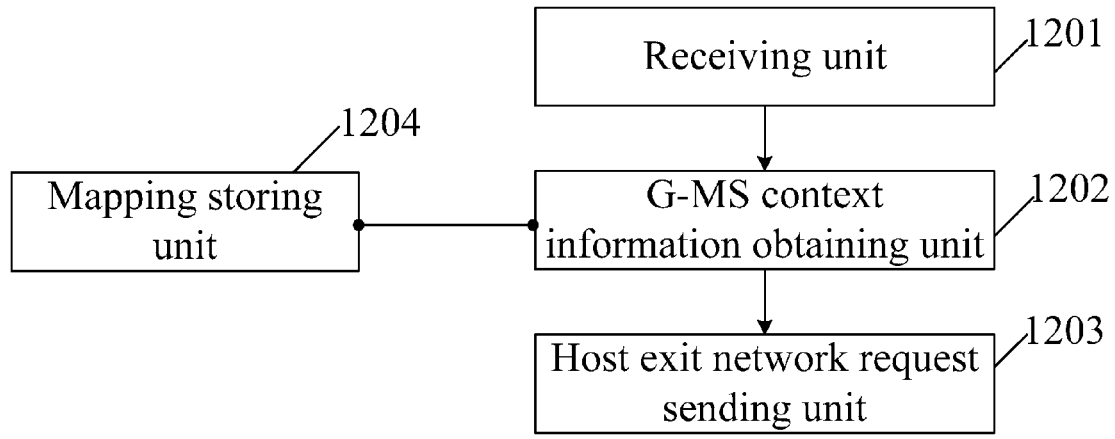
FIG. 12 shows the G-MS network management device provided in Embodiment 11 of the present invention.

As shown in FIG. 12, a host network management device is provided in an embodiment of the present invention A receiving unit 1201 is configured to receive a command that instruct the host to exit from the network. The command carries the host ID. A G-MS context information obtaining unit 1202 is configured to obtain the G-MS context information relating to the host connected to the G-MS according to the host ID after receiving a host exit network instruction from the G-MS exit network instruction receiving unit 1201. The host context information comprises ID of the G-MS, to which the host is connected and the ID of the G-MS network management entity.

A host exit network request sending unit 1203 is configured to send a host exit network request to the G-MS network management entity according to the ID of the G-MS network management entity. The host exit network request carries the host ID.

The device further comprises a mapping storing unit 1204 that is configured to store the mapping between the G-MS ID and the context information relating to the host, which is connected to the G-MS.

The G-MS context information obtaining unit 1202 is configured to obtain context information relating to the G-MS, to which the host is connected according to the mapping stored in the mapping storing unit between the host ID and the context information relating to the host connected to the G-MS.

A network system is provided in an embodiment of the present invention. The system comprises a G-MS network management entity and a host network management entity.

The G-MS network management entity is configured to obtain context information relating to the host connected to the G-MS after receiving a G-MS exit network instruction and send host exit network instruction to the host network management entity according to the ID of the G-MS network management entity. The obtained host context information comprises the ID of the host connected to the G-MS and the ID of the host network management entity. The exit network instruction carries the host ID.

The host network management entity is configured to release the host context information according to the host ID after receiving the host exit network instruction.

A network system is provided in Embodiment 13 of the present invention. The system comprises a G-MS network management entity and a host network management entity.

The host network management entity is configured to obtain G-MS context information relating to the host connected to the G-MS after receiving host exit network instruction that carries the host ID and send a host exit network request to the G-MS network management entity according to the ID of the G-MS network management entity. The G-MS context information comprises the ID of the G-MS, to which the host is connected, and the ID of the G-MS network management entity. The host exit network request carries the host ID.

The G-MS network management entity is configured to delete the host context information according to the host ID.

The preceding analysis reveals that embodiments of the present invention have a number of benefits.

After receiving a G-MS exit network instruction, the G-MS network management entity provided in an embodiment of the present invention sends host exit network instruction to the network management entity of the host connected to the G-MS to indicate the process in which the host exits from the network and ensure that all hosts connected to the G-MS can exit from the network normally.

After receiving a host exit network instruction, the host network management entity provided in an embodiment of the present invention sends a host exit network request to the network management entity of the host connected to the G-MS to trigger the host to exit from the G-MS network, that is, deleting the host context information, to ensure that the host can exit from the network normally.

Detailed above are a method, network management system and network system for disconnecting a multi-host system from the network provided in an embodiment of the present invention. Although the invention is described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method of disconnecting hosts from a network, the method comprising:

receiving, by a Gateway Mobile Station (G-MS) management entity, a G-MS exit network instruction indicating that a gateway mobile station is exiting the network, wherein a plurality of host devices are using the gateway mobile station to connect to the network, the host devices being separate and distinct from the gateway mobile station, and wherein the G-MS exit network instruction includes a G-MS identifier (ID) of the gateway mobile station but excludes host identifiers (IDs) of the plurality of host devices using the gateway mobile station to connect to the network;

mapping, by the G-MS management entity, the G-MS ID to a host context information, wherein the host context information comprises the host IDs of the plurality of host devices and one or more host network management entity IDs of one or more host network management entities; and sending, by the G-MS management entity, one or more host exit network instructions carrying the host IDs to the one or more host network management entities according to the one or more host network management entity IDs, wherein the one or more host exit network instructions initiate a process of disconnecting the plurality of host devices from the network.

2. The method according to claim 1, wherein mapping the G-MS ID to the host context information comprises:

mapping the G-MS ID to the host context information in accordance with a mapping relationship, wherein the mapping relationship was established, by the G-MS management entity when the host devices initially used the gateway mobile station to access the network.

3. The method according to claim 1, wherein the G-MS management entity is a G-MS authenticator and the host network management entity is a host Authentication, Authorization, and Accounting proxy; or the G-MS management entity is a G-MS authenticator and the host network management entity is a host authenticator; or the G-MS management entity is a G-MS anchor data path function (DPF) and the host network management entity is a host anchor DPF.

4. The method according to claim 3, wherein the G-MS exit network instruction is received from the gateway mobile station.

5. The method according to claim 3, wherein the G-MS exit network instruction is received from a G-MS Authentication, Authorization, and Accounting (AAA) server.

6. The method according to claim 3, wherein, after sending the host exit network instruction to the host network management entity, the method further comprises:
   deleting, by the host network management entity, the host context information according to the host ID carried in the host exit network instruction.

7. The method of claim 1, wherein the host devices are incapable of accessing the network directly, and wherein the gateway mobile station provides the host devices with access to the network.

8. The method according to claim 1, wherein the host context information is excluded from the G-MS exit network instruction, wherein each of the host IDs are assigned exclusively to one of the plurality of hosts, wherein the G-MS ID is assigned exclusively to the gateway mobile station, and wherein the host IDs are different than the G-MS ID.

9. The method according to claim 1, wherein the G-MS management entity is a G-MS authenticator and the host network management entity is a host Authentication, Authorization, and Accounting proxy.

10. The method according to claim 1, wherein the G-MS management entity is a G-MS authenticator and the host network management entity is a host authenticator.

11. The method according to claim 1, wherein the G-MS management entity is a G-MS anchor data path function (DPF) and the host network management entity is a host anchor DPF.

12. The method according to claim 1, wherein the host IDs exclude the G-MS ID.

13. A Gateway Mobile Station (G-MS) management entity comprising:
   a processor; and
   a computer readable storage medium storing programming for execution by the processor, the programming including instructions to:
      receive a G-MS exit network instruction indicating that a gateway mobile station is exiting the network, wherein a plurality of host devices are using the gateway mobile station to connect to the network, the host devices being separate and distinct from the gateway mobile station, and wherein the G-MS exit network instruction includes a G-MS identifier (ID) of the gateway mobile station but excludes host identifiers (IDs) associated with the plurality of host devices using the gateway mobile station to connect to the network;
      map the G-MS ID to a host context information, wherein the host context information comprises the host IDs for the plurality of host devices and one or more host network management entity IDs of one or more host network management entities; and
      send one or more host exit network instructions carrying the host IDs to the one or more host network management entities according to the one or more host network management entity IDs, wherein the one or more host exit network instructions initiate a process of disconnecting the plurality of host devices from the network.

14. The G-MS management entity of claim 13, wherein the host devices are incapable of accessing the network directly, and wherein the gateway mobile station provides the host devices with access to the network.

15. The G-MS management entity of claim 13, wherein the host context information is excluded from the G-MS exit network instruction, wherein each of the host IDs are assigned exclusively to one of the plurality of hosts, wherein the G-MS ID is assigned exclusively to the gateway mobile station, and wherein the host IDs are different than the G-MS ID.

16. The G-MS management entity of claim 13, wherein the host IDs exclude the G-MS ID.

17. The G-MS management entity of claim 13, wherein the G-MS management entity is a G-MS authenticator and the host network management entity is a host Authentication, Authorization, and Accounting proxy.

18. The G-MS management entity of claim 13, wherein the G-MS management entity is a G-MS authenticator and the host network management entity is a host authenticator.

19. The G-MS management entity of claim 13, wherein the G-MS management entity is a G-MS anchor data path function (DPF) and the host network management entity is a host anchor DPF.

* * * * *